April 25, 1950   L. J. SMITH   2,505,588
MOUNTING CLAMP FOR BRACKETS
Filed March 17, 1948
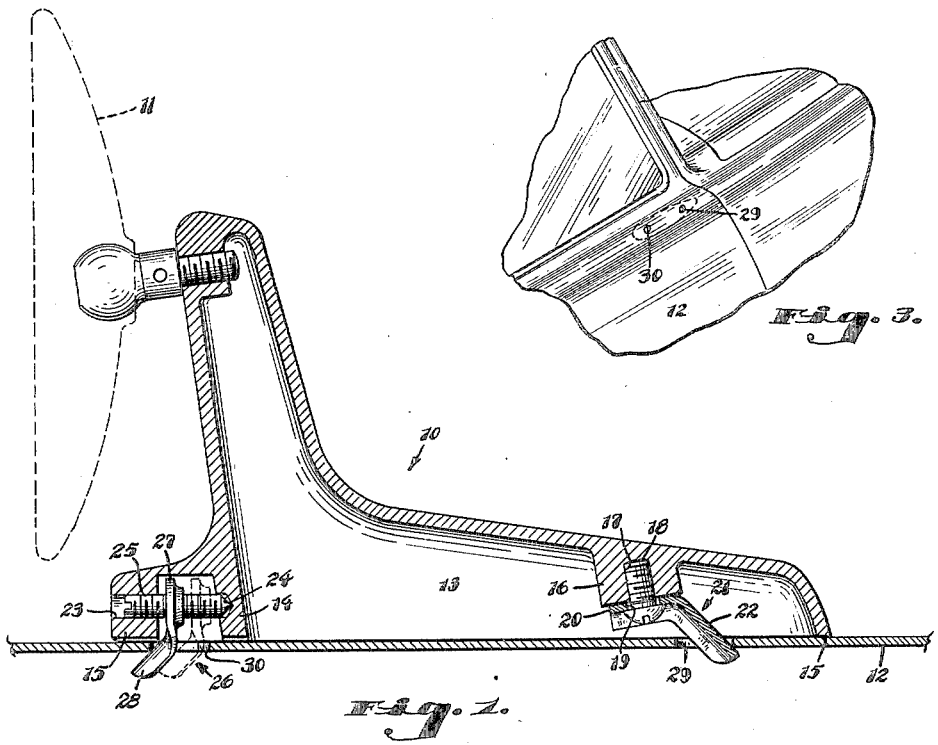
Fig. 3.
Fig. 1.
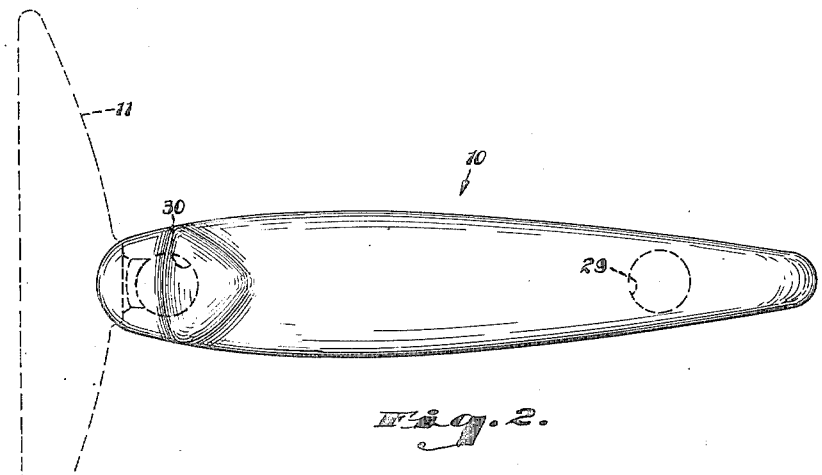
Fig. 2.
INVENTOR.
LOWELL J. SMITH,
BY: Harold B. Hood
ATTORNEY.

Patented Apr. 25, 1950

2,505,588

UNITED STATES PATENT OFFICE 2,505,588

MOUNTING CLAMP FOR BRACKETS

Lowell J. Smith, Connersville, Ind., assignor to Stant Manufacturing Company, Connersville, Ind., a corporation of Indiana Application March 17, 1948, Serial No. 15,347

3 Claims. (Cl. 248—205)

1

The present invention relates to a mounting clamp for a bracket which, in the illustrated embodiment of the invention, is intended to support a rear vision mirror on the outside of an automobile body. It will be apparent that the clamp disclosed herein is applicable, however, to other uses.

The primary object of the invention is to provide means whereby a bracket of suitable construction may be mounted upon a member without disfigurement of the supporting member and without using fastening means which must be manipulated from the reverse side of the member upon which the bracket, or the like, is to be mounted. A further object of the invention is to provide means for mounting such a device, wherein the supporting member need only be provided with two small spaced openings, whereafter the device to be mounted and the clamping means may be associated with the member and securely fixed in place thereon by manipulation of the clamping means from one side only of the member upon which the device is to be mounted. Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a longitudinal sectional view through a bracket, having my clamping means associated therewith, showing the bracket and clamping means in operative association with a fragment of a member upon which the bracket is to be mounted;

Fig. 2 is a plan view of the bracket; and

Fig. 3 is a fragmental perspective view of a part of an automobile body, showing the manner in which a bracket of the character illustrated in Fig. 1 may be mounted thereon.

Referring more particularly to the drawings, it will be seen that I have illustrated a bracket comprising a hollow body 10 adapted to provide a mounting support for a rear view mirror 11, or the like, and adapted to be mounted upon a panel 12 of an automobile body, for instance. It will be obvious to those familiar with automobile construction that it is a difficult and expensive operation to obtain access to the inner surface of a panel of an automobile body; and that therefore it is desirable to provide means, manipulable

2 entirely from the outer surface of such a panel, for mounting thereon any accessory intended to be associated with the vehicle after completion of the vehicle by the manufacturer.

As illustrated, the bracket body 10 is formed to provide a cavity 13 into which projects a stud or partition 14. The mouth of the cavity 13 is defined by a perimetral foot or lip 15 whose terminal edge will preferably lie in a single plane. Preferably, but not necessarily, the outline of the bracket body 10, when viewed in plan, will be substantially as illustrated in Fig. 2.

Within the cavity 13, the body 10 is formed, adjacent one end thereof, to provide a stud or table 16 formed with a threaded socket 17 for the reception of a fastening screw 18 adapted to pass through an aperture 19 in the base portion 20 of a finger 21 which is formed to provide an extension 22 angularly related to the base 20. When the finger 21 is associated with the stud 16, it will be so arranged that the projection 22 inclines toward the adjacent end of the body 10, and extends beyond the plane in which lies the terminus of the body foot portion 15.

At its opposite end, the body 10 is formed with a smooth bore 23; and that surface of the partition or stud 14 which faces the bore 23 is provided with a socket 24 in alignment with said bore. Journalled in the bore 23 and the socket 24 is a screw 25, traversing that portion of the cavity 13 which is divided from the main portion of said cavity by the stud or partition 14.

A second finger 26 is formed to provide a base portion 27 penetrated by a threaded opening. The screw 25 threadedly traverses said threaded opening to support the finger 26 with its base portion 27 within the cavity. The finger 26 further comprises a projection 28 angularly related to the base portion 27; and, when the parts are properly assembled, the projection 28 will incline toward the adjacent end of the bracket body 10 and will extend through the plane in which lies the terminal portion of the foot means 15.

The screw 25 is preferably mounted upon an axis parallel with a line joining the termini of the finger projections 22 and 28; and the engagement of said screw in the socket 24 prohibits bodily movement of the screw 25 toward the finger 21.

The panel 12 is provided with two openings 29 and 30 so spaced relative to each other that, with the finger 26 in the dotted line position of Fig. 1, the finger projection 22 may be engaged in the panel opening 29, whereafter the finger projection 28 may be entered in the panel opening 30.

Now, if the screw 25, whose kerfed end is accessible through the open end of the bore 23, is rotated in one direction, the finger 26 will be caused to retreat from the finger 22 to assume the position illustrated in solid lines in Fig. 1, whereby the finger projection 22 and the finger projection 28 may be caused to press oppositely against the remote edges of the openings 29 and 30, respectively. Because of the camming effect produced by the divergent inclinations of said projections 22 and 28, the bracket body 10 will thereby be firmly clamped to the panel 12.

By means of the disclosed clamping mechanism, I avoid the necessity for gaining access to the inner surface of the body panel 12; and I also avoid the appearance of fastening means upon the exterior surface of the bracket body 10. The clamping means is manipulable entirely through the open end of the bore 23; and, if desired, the screw 25 may be so proportioned and designed that its outer end will lie substantially flush with the mouth of the bore 23 when the parts are in the illustrated positions.

I claim as my invention:

1. For a hollow body having perimetral foot means, and adapted to be secured to a member provided with two spaced openings, clamp means comprising a finger including a base and an angularly-related projection, means cooperating with said finger base and said body to attach said finger to said body with said base located within said hollow body and said projection inclined toward an adjacent edge of said body and extending beyond said foot means, a second finger including a base and an angularly-related projection, means independent of said first-named attaching means cooperating with the base of said second finger and the body to attach said second finger to said body with its base located within said hollow body and said projection inclined toward another edge of said body and extending beyond said foot means, said finger projections being respectively enterable in said apertures, the attaching means for one of said fingers being operable to shift said one finger forcibly to increase the distance between said finger projections.

2. In a device of the class described, a body having a cavity defined by perimetrally-arranged foot means, a table located entirely within said cavity and providing a surface generally facing said foot means, a finger having a base portion and a projection portion angularly related to each other, means cooperating with the base portion of said finger to secure the same to said table with said finger base portion supportingly engaging said surface and said finger projection portion extending outside said cavity and inclined toward one edge of the boundary defined by said foot means, abutment means located wholly inside said cavity at a point spaced from said table and located nearer an edge of such boundary opposite said first-named edge, a screw loosely penetrating a wall of said body substantially at said last-named boundary edge and having its inner end supported on said abutment, a second finger having a base section and an angularly related projection portion, said base portion having a threaded aperture therein threadedly mounted on said screw in the region between said body wall and said abutment, said projection portion of said second finger extending outside said cavity and being inclined toward said last-named boundary edge when said second finger is so mounted, and said screw being rotatable to force said second finger toward said last-named boundary edge.

3. In a device of the class described, a body having a cavity defined by perimetrally-arranged foot means, a table located entirely within said cavity and providing a surface penetrated by a threaded opening and generally facing said foot means, a finger having a base portion and a projection portion angularly related to each other, said finger base portion having an aperture therethrough, a screw penetrating said aperture and threadedly engaged in said opening to secure said finger to said table with said finger base portion supportingly engaging said surface and said finger projection portion extending outside said cavity and inclined toward one edge of the boundary defined by said foot means, abutment means located wholly inside said cavity at a point spaced from said table and located nearer an edge of such boundary opposite said first-named edge, a screw loosely penetrating a wall of said body substantially at said last-named boundary edge and having its inner end supported on said abutment, a second finger having a base section and an angularly related projection portion, said base portion having a threaded aperture therein threadedly mounted on said screw in the region between said body wall and said abutment, said projection portion of said second finger extending outside said cavity and being inclined toward said last-named boundary edge when said second finger is so mounted, and said screw being rotatable to force said second finger toward said last-named boundary edge.

LOWELL J. SMITH.

REFERENCES CITED

The following references are of record in the file of this patent:

UNITED STATES PATENTS

| Number | Name | Date |
|---|---|---|
| 1,335,881 | Dottl | Apr. 6, 1920 |
| 2,293,303 | Morley | Aug. 18, 1942 |
| 2,447,786 | Anderson | Aug. 24, 1948 |